No. 672,709. Patented Apr. 23, 1901.
C. PANTEN.
MACHINE FOR THE DESTRUCTION OF WEEDS OR THE LIKE.
(Application filed Dec. 13, 1899.)
(No Model.)

Witnesses
Inventor
Carl Panten

UNITED STATES PATENT OFFICE.

CARL PANTEN, OF THAMMENHAIN, GERMANY.

MACHINE FOR THE DESTRUCTION OF WEEDS OR THE LIKE.

SPECIFICATION forming part of Letters Patent No. 672,709, dated April 23, 1901.

Application filed December 13, 1899. Serial No. 740,176. (No model.)

*To all whom it may concern:*

Be it known that I, CARL PANTEN, a subject of the King of Saxony, residing at Thammenhain, Post Falkenhain, district of Leipsic, Saxony, Germany, have invented certain new and useful Improvements in Machines for the Destruction of Weeds or the Like, (for which I have applied for patents in Germany, dated November 6, 1899; in Austria, dated November 8, 1899; in Hungary, dated November 11, 1899; in France, dated November 13, 1899; in Belgium, dated November 13, 1899, and in England, dated November 13, 1899,) of which the following is a specification.

Paths in parks and other roads are usually kept free from weeds by loosening the gravel and soil and removing the weeds, which is a very inconvenient method, because the soil has to be pressed down again and the layer of gravel has to be renewed or added to afterward.

This invention is designed to destroy the weeds in a more rational manner by a machine which heats the soil to a certain depth, so that the weeds or plants and the roots and germs thereof contained in the soil dry up completely, and thus lose their vitality. Further, the soil is rendered unfit for a long time by such heat to support germination. The machine requires only one attendant and is very economical.

In order that this invention may be the better understood, I now proceed to describe the same, reference being had to the accompanying drawings and to the letters and figures marked thereon.

Like letters refer to like parts in both figures.

Figure 1:
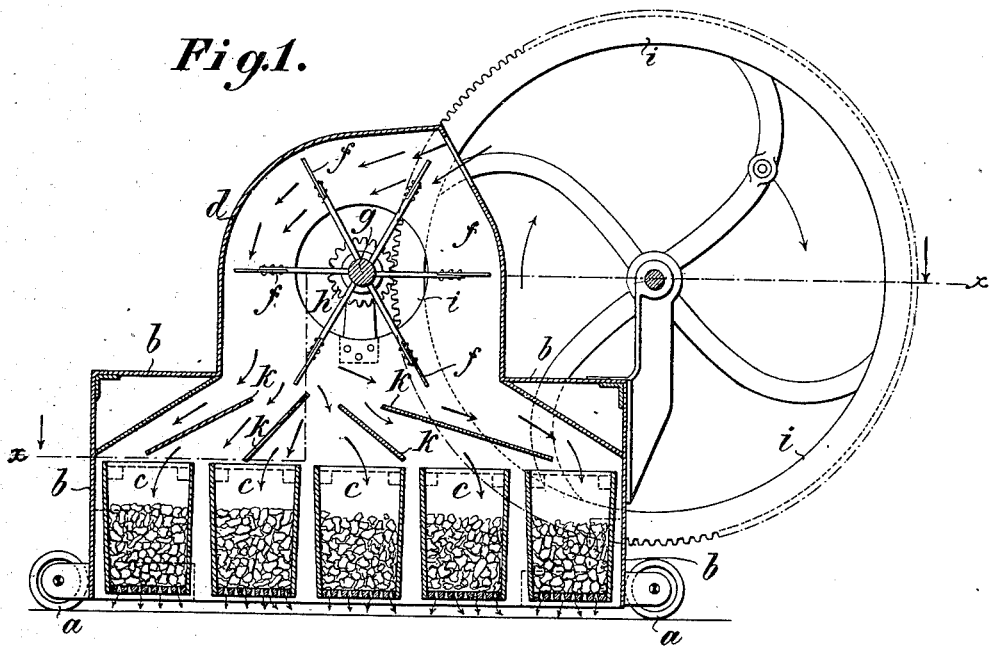
Figure 2:
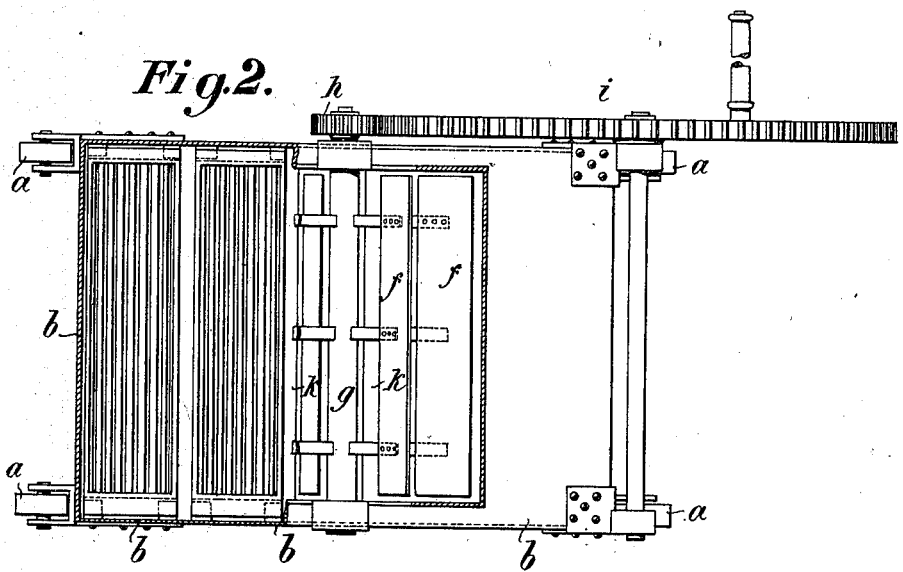

Figure 1 shows a longitudinal section; and Fig. 2 is a plan, partly in section, the section being taken along line $x\ x$ of Fig. 1.

The machine consists of a casing $b$, open at the bottom and running on wheels $a$. A number of ovens or frames $c$ for the reception of coke or other fuel are arranged within the casing $b$ in a suitable manner. Above the ovens $c$ is arranged a fan $d$ in the casing $b$, the vanes $f$ of such fan feeding air to the ovens $c$ in order to induce a draft to keep the coke or other fuel burning and to press the hot air in the ovens $c$ downward against the soil. The vanes $f$ of the fan are situated on a common axle $g$, the farther end of which carries a small cog-wheel $h$, which engages with a larger cog-wheel $i$, which acts as a fly-wheel and is operated by hand through the attendant in order to rotate the fan.

In order that the air introduced by the vanes $f$ may be distributed evenly to all the ovens $c$, distributing-partitions $k$ are provided within the casing and are arranged relative to one another in any manner to obtain the desired object.

When a machine constructed and heated as described is propelled on a path or road on which the weeds are to be destroyed the radiating heat from the ovens $c$ and the hot air pressed down from the machine act upon the weeds, so that the parts grown above the soil or gravel wither and burn and the upper crust or part of the path or road becomes very hot, so that roots and germs are destroyed. If there be strong roots in the soil, the operation may be repeated, if desired.

In order to secure a thorough effect, it is advisable to allow the machine to rest on a part of the path or road for a time, according to the nature of the soil and weeds—say a minute or more or less—and then to move it along a distance corresponding to the length of the heating-surface and then to let it rest again, and so on.

What I claim, and desire to secure by Letters Patent of the United States, is—

In a machine for destroying weeds the combination of a wheeled casing, a plurality of separate heat-producing chambers located within said casing at the lower part thereof, means located at the upper part of said casing for producing a blast of air and air deflecting and distributing partitions arranged above the aforesaid heat-producing devices and located in the path of the air-blast.

In testimony whereof I have hereunto set my hand in the presence of two witnesses.

. CARL PANTEN.

Witnesses:
 CARL HERMANN SANDER,
 RUDOLPH FRICKE.